(12) United States Patent
Aryanpanah et al.

(10) Patent No.: US 12,208,946 B2
(45) Date of Patent: Jan. 28, 2025

(54) CHILDPROOF JAR

(71) Applicants: David Aryanpanah, Beverly Hills, CA (US); Brian Anav, Beverly Hills, CA (US)

(72) Inventors: David Aryanpanah, Beverly Hills, CA (US); Brian Anav, Beverly Hills, CA (US)

(73) Assignee: A&AFulfillment Center, Inc., Vernon, CA (US)

( * ) Notice: Subject to any disclaimer, the term of this patent is extended or adjusted under 35 U.S.C. 154(b) by 754 days.

(21) Appl. No.: 16/539,692

(22) Filed: Aug. 13, 2019

(65) Prior Publication Data

US 2019/0367225 A1    Dec. 5, 2019

Related U.S. Application Data

(63) Continuation of application No. 15/827,055, filed on Nov. 30, 2017, now Pat. No. 10,414,560.

(51) Int. Cl.
| | |
|---|---|
| *B65D 50/04* | (2006.01) |
| *A61J 1/03* | (2023.01) |
| *C03C 17/00* | (2006.01) |
| *C03C 23/00* | (2006.01) |

(52) U.S. Cl.
CPC ............... *B65D 50/04* (2013.01); *A61J 1/03* (2013.01); *B65D 50/041* (2013.01); *C03C 17/005* (2013.01); *C03C 23/002* (2013.01)

(58) Field of Classification Search
CPC .......... B65D 50/04; A61J 1/03; C03C 17/005; C03C 23/002

USPC ................................ 215/217, 219, 220, 223
See application file for complete search history.

(56) References Cited

U.S. PATENT DOCUMENTS

| | | |
|---|---|---|
| 25,617 A | 10/1859 | Armitage |
| 35,068 A | 4/1862 | Allen |
| 35,412 A | 5/1862 | Callender et al. |
| 92,173 A | 7/1869 | Cox |
| 93,174 A | 8/1869 | Chamberlain |
| 99,461 A | 2/1870 | Munson |

(Continued)

FOREIGN PATENT DOCUMENTS

EP    2328820    6/2011

OTHER PUBLICATIONS

Herb Preserve. Printed Aug. 17, 2017. "We Have the Science to Keep Your Herb Fresh." https://www.herbpreserve.com/pages/science.

(Continued)

*Primary Examiner* — J. Gregory Pickett
*Assistant Examiner* — Niki M Eloshway
(74) *Attorney, Agent, or Firm* — Jafari Law Group, Inc.

(57) ABSTRACT

The invention involves a childproof jar that suitable for medicinal items such as tablets, medication or other consumables that may be desirably restricted from children. The childproof mechanism that restricts access to the contents of the jar may employ a childproof cap comprising an outer cap and an inner cap that is operable by applying a force along the rotational axis of the cap—or by pressing down on the cap and twisting or rotating the cap. Typically, the jar is treated or coated with a uv-treatment or coating that limits or prevents light from reaching the contents of the jar.

7 Claims, 7 Drawing Sheets

(56) References Cited

U.S. PATENT DOCUMENTS

| | | | |
|---|---|---|---|
| D112,940 S | 11/1936 | Fuerst | |
| D163,148 S | 9/1947 | Sterrett | |
| 3,980,194 A | 9/1976 | Costa | |
| 4,053,077 A | 10/1977 | DeFelice | |
| 4,089,433 A | 5/1978 | Jonsson | |
| 4,154,353 A | 5/1979 | Hoo | |
| 4,253,878 A | 3/1981 | Weaver | |
| 4,387,822 A | 6/1983 | Lynn | |
| 4,664,273 A | 5/1987 | Simon | |
| 4,732,288 A | 3/1988 | Morris | |
| 4,957,210 A | 9/1990 | Kusz | |
| 4,997,096 A | 3/1991 | Kusz | |
| 5,105,960 A | 4/1992 | Crisci | |
| 5,520,296 A | 5/1996 | Freed | |
| 5,588,545 A * | 12/1996 | King | B65D 41/0414 215/216 |
| 5,678,712 A | 10/1997 | Rios | |
| 5,702,013 A | 12/1997 | Freed | |
| 5,762,215 A * | 6/1998 | Ogden | B65D 50/041 215/220 |
| 6,073,809 A | 6/2000 | Long | |
| D433,631 S | 11/2000 | Walsh | |
| 6,206,216 B1 | 3/2001 | Stalions | |
| 6,659,236 B1 | 10/2003 | Low | |
| 6,702,134 B2 | 3/2004 | Scalese | |
| 6,871,752 B2 | 3/2005 | Montgomery | |
| 6,913,157 B2 | 7/2005 | Oh | |
| 7,128,233 B2 | 10/2006 | Hogan | |
| 7,150,902 B2 | 12/2006 | Farha | |
| 7,331,479 B2 | 2/2008 | Oh | |
| 7,344,167 B2 | 3/2008 | Johnson | |
| 7,405,647 B2 | 7/2008 | Rosche | |
| D587,534 S | 3/2009 | Carreno | |
| 7,819,264 B2 | 10/2010 | Brozell | |
| 7,837,048 B2 | 11/2010 | Lusker | |
| 7,900,789 B2 | 3/2011 | Johnston | |
| 8,377,029 B2 | 2/2013 | Nagao | |
| D685,231 S | 7/2013 | Lane | |
| 8,474,634 B1 | 7/2013 | Branson | |
| 8,839,976 B2 | 9/2014 | Morris | |
| 8,844,722 B2 | 9/2014 | Wang | |
| D744,781 S | 12/2015 | Rummel | |
| 9,475,624 B2 | 10/2016 | Thomas | |
| 9,527,619 B2 | 12/2016 | Patel | |
| 9,718,588 B2 | 8/2017 | Bates | |
| 2005/0150857 A1 | 7/2005 | Brozell | |
| 2008/0200321 A1 | 8/2008 | Bittner | |
| 2009/0032486 A1* | 2/2009 | Brozell | B65D 50/041 215/220 |
| 2011/0108508 A1 | 5/2011 | Kientzle | |
| 2011/0139742 A1 | 6/2011 | Brozell | |
| 2012/0138503 A1 | 6/2012 | Patel | |
| 2012/0138561 A1 | 6/2012 | Brozell | |
| 2015/0122767 A1 | 5/2015 | Mettu | |
| 2016/0096666 A1 | 4/2016 | Murray | |
| 2016/0176591 A1 | 6/2016 | Thomas | |

OTHER PUBLICATIONS

Cannador. Printed Aug. 17, 2017. "Cannabis Storage and Ultraviolet Light." https://cannador.com/articles/single/cannabis-storage-and-ultraviolet-light.

eBottles.com. Printed Aug. 17, 2017. "Amber Straight Sided Jars Bottles." https://www.ebottles.com/showbottles-bottle-1688-kw-Amber+Straight+Sided+Jars.htm.

Pontillo. Printed Aug. 17, 2017. "Are Ultraviolet Cosmetic Glass Bottles Worth the Price?" https://rachaelpontillo.com/are-ultraviolet-glass-bottles-worth-the-price/.

eBottles.com. Printed Aug. 17, 2017. "PET Straight Sided Child Resistant Jars Airtight Black PET Bottles." https://www.ebottles.com/showbottles-bottle-1592-kw-PET_STRAIGHT_SIDED_CHILD_RESISTANT_JARS_AIRTIGHT_BLACK_PET.htm.

Miron Violet Glass. Printed Aug. 17, 2017. "Child-proof lock screw cap with inlay, black" http://www.miron-glas.com/en/products/156-Child-proof-lock-screw-cap-with-inlay-black.

\* cited by examiner

CHILDPROOF JAR

TECHNICAL FIELD OF THE INVENTION

The present invention relates generally to a childproof receptacle or container, and more specifically, to a childproof jar for storing items such as medicinal consumables in a manner that restricts access to children, and which is treated to include a UV protection layer to preserve a potency of the stored items and keep them fresh.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Childproof receptacles or containers, such as childproof medicine bottles have been around for some time. In fact, the prior art is riddled with different teachings for a wide variety of these so-called safety bottles, and particularly safety caps for bottles. However, known devices have several shortcomings, which have not been properly addressed.

For example, several teachings focus on devices that require a heighten dexterity in order to operate the locking means of the container. The problem with many of such known devices is that although difficult for children to operate, such devices are also difficult for the elderly or weaken patients to operate as well. One example of such child resistant containers can be found in U.S. Pat. No. 4,053,077 to DeFelice. DeFelice discloses a child safety cap for a container generally of the screw on type, and of the push and turn variety, wherein cap and container are provided with screw threads having inter-engaging ratchet-like teeth at portions thereof, preventing a turn of the cap in a direction to remove it, but including structures providing for pushing down upon the cap to release the teeth making it possible to turn the cap off. To operate this device, a user has to press down to disengage the ratchet-like teeth. The problem here is that these devices typically require forces generally prohibitive to elderly or weaker patients. Moreover, the threading on the container itself is complex as it requires teeth-like structures, which are difficult to manufacture on certain types of containers such glass containers including glass jars.

Similarly, there are other devices that involve structural elements that facilitate the locking means of these containers, but which are unnecessarily complex and thus expensive to manufacture. For example, U.S. Pat. No. 7,819,264 to Brozell et al. teaches a child resistant package including a cap with spring elements on a cap interior surface that facilitates a locking mechanism. The locking mechanism prevents unthreading of the closure absent pressure on the closure against the spring elements. The problem here is that the design itself is very complex from a structural point of view, in that several protrusions and moving parts (i.e. spring elements) resultantly increase the manufacturing costs of the safety means.

Other so-called safety cap designs require that the bottle or container that attaches to the cap have specific structural elements in order for the safety feature of the safety cap to function—such designs thus limit the type of bottles that can be used with those designs; for example, while certain structural elements may be somewhat easier to achieve on plastic containers, implementing the same structural elements in glass containers may be difficult, too expensive or altogether impossible due to the limitations of manufacturing methods of glass containers. For example, U.S. Pat. No. 5,702,013 to Freed describes a dynamic virtual hinge closure with child-resistance features. A hook dynamically engages with a slot to create a virtual hinge each time the closure is opened. The hook dynamically disengages with the slot each time the closure is closed. The hook is disposed diametrically opposite a locking lug, which must be situated on the container or bottle itself. Similarly, U.S. Pat. No. 7,331,479 to Oh describes a locking cap and container having container threads thereon that are sized and located to engage cap threads formed on a skirt of the cap. Thus, in order for these devices to function, resilient locking tabs or other structural elements must extend from the container itself.

Yet other designs involve odd shapes that are not ideal for easily carrying around the receptacles, which often carry daily medicine and are thus needed on a regular basis. Moreover, odd or uneven shaped containers make their storage by manufacturers or distributers much more difficult, and thus undesirable.

Childproof containers have also implemented means of UV resistance. For example, this much is disclosed in U.S. Pat. No. 9,527,619 to Patel, which teaches a biodegradable pharmacy container and safety cap comprising a biodegradable material that includes a bioplastic resin and a plasticizer. The problem with this container is that it implements plastics on the bottle itself; while such materials may be acceptable to store certain medicines, other items—particularly edible or consumable items with an enjoyable smell or taste—may be affected by the plastics. Accordingly, it is desirable to avoid plastics of such containers so as to preserve the original state of the items stored therein.

Therefore, there exists a previously unappreciated need for a new and improved childproof jar that is easy to operate by all adults, including the elderly; that implements mechanisms that do not require complex structures employed on the jar itself; that implements adequate protection from light rays so as to preserve the potency of the items stored therein; that is shaped in a manner so that the jar is easy to handle and stack for storage; and that is inexpensive to manufacture.

It is to these ends that the present invention has been developed.

SUMMARY OF THE INVENTION

To minimize the limitations in the prior art, and to minimize other limitations that will be apparent upon reading and understanding the present specification, the present invention describes a childproof box for storing items in a manner that restricts access to children, but that is easy to operate by the elderly.

Generally, the invention involves a childproof jar suitable for storing items such as prescription medication, non-prescription medication, supplements, edibles or consumables and other items that may be desirably restricted from children and desirably stored in a glass container such as a jar. In exemplary embodiments, the childproof mechanism that restricts access to the contents of the jar employs a childproof cap comprising an outer cap and an inner cap that is operable by applying a force along the rotational axis of the cap—or by pressing down on the cap and twisting or rotating the cap. The outer cap includes an interior surface with downward projections that register with upward projections on a top surface of the inner cap. The projections are shaped in a particular manner to maximize effectiveness in operation of the device, while minimizing manufacturing costs of the same. Moreover, the inner cap further includes an interior wall with at least one thread that registers with a threaded rim mouth of the jar. The jar's rim mouth excludes any tabs, or auxiliary locking structures other than a threaded rim mouth that registers with the thread of the interior wall of the inner cap. Typically, the jar comprises a glass jar and is treated or coated with a uv-treatment or coating that limits or prevents light from reaching the contents of the jar.

A childproof jar, in accordance with an exemplary embodiment of the present invention, comprises: a uv-coated glass jar having a threaded rim mouth; and a childproof cap, comprising: an outer cap including an interior surface with a plurality of downward projections radially situated along a circumference of the interior surface; and an inner cap including a top surface with a plurality of upward projections radially situated along a circumference of the top surface, wherein: the inner cap registers with the threaded rim mouth of the uv-coated glass jar, and the outer cap registers with the inner cap upon an application of a pressing force on the outer cap approximately along a rotational axis of the childproof cap, causing outer walls of the plurality of upward projections of the inner cap to register with outer walls of the parallel protrusions of the outer cap in order to operate the childproof cap.

A childproof jar, in accordance with another exemplary embodiment of the present invention, comprises: a uv-coated glass jar having a threaded rim mouth; and a childproof cap, comprising: an outer cap including an interior surface with a plurality of downward projections radially situated along a circumference of the interior surface, each of the plurality of downward projections comprising a flat base with parallel protrusions separated by an elongated gap; and an inner cap including a top surface with a plurality of upward projections radially situated along a circumference of the top surface, wherein: the inner cap registers with the threaded rim mouth of the uv-coated glass jar, and the outer cap registers with the inner cap upon an application of a pressing force on the outer cap approximately along a rotational axis of the childproof cap, causing outer walls of the plurality of upward projections of the inner cap to register with outer walls of the parallel protrusions of the outer cap in order to operate the childproof cap.

A childproof jar, in accordance with yet another exemplary embodiment of the present invention, comprises: a uv-coated glass jar having a threaded rim mouth; and a childproof cap, comprising: an outer cap including an interior surface with a plurality of downward projections radially situated along a circumference of the interior surface, each of the plurality of downward projections comprising a flat base with parallel protrusions separated by a narrow gap; and an inner cap including an interior threaded wall comprising a single continuous thread that engages the threaded rim mouth of the uv-coated jar during operation of the childproof cap, the inner cap further including an exterior ridge along a bottom edge of the inner cap, and a top surface with a plurality of upward projections radially situated along a circumference of the top surface, wherein: the inner cap registers with the threaded rim mouth of the uv-coated glass jar, the inner cap rests loosely secured within the outer cap between the interior surface and an interior ridge along a bottom edge of the outer cap when the childproof cap is not operational, and the outer cap registers with the inner cap upon an application of a pressing force on the outer cap approximately along a rotational axis of the childproof cap, causing outer walls of the plurality of upward projections of the inner cap to register with outer walls of the parallel protrusions of the outer cap in order to operate the childproof cap.

It is an objective of the present invention to provide a childproof jar that is easy to operate by all adults, including the elderly.

It is another objective of the present invention to provide a childproof jar that implements mechanisms, which do not require complex structures employed on the jar itself.

It is yet another objective of the present invention to provide a childproof jar that implements adequate protection from light rays so as to preserve the potency of the items stored therein.

It is yet another objective of the present invention to provide a childproof jar that is shaped for efficient storage and handling of the containers, by manufacturers, distributors and users alike.

It is yet another objective of the present invention to provide a childproof jar that is effective at preventing children from accessing the contents of the jar, but that is inexpensive to manufacture.

These advantages and features of the present invention are not meant as limiting objectives, but are described herein with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of the various embodiments of the invention. Furthermore, elements that are known to be common and well understood to those in the industry are not depicted in order to provide a clear view of the various embodiments of the invention. The drawings that accompany the detailed description can be briefly described as follows.

DETAILED DESCRIPTION OF THE INVENTION

Figure 1:
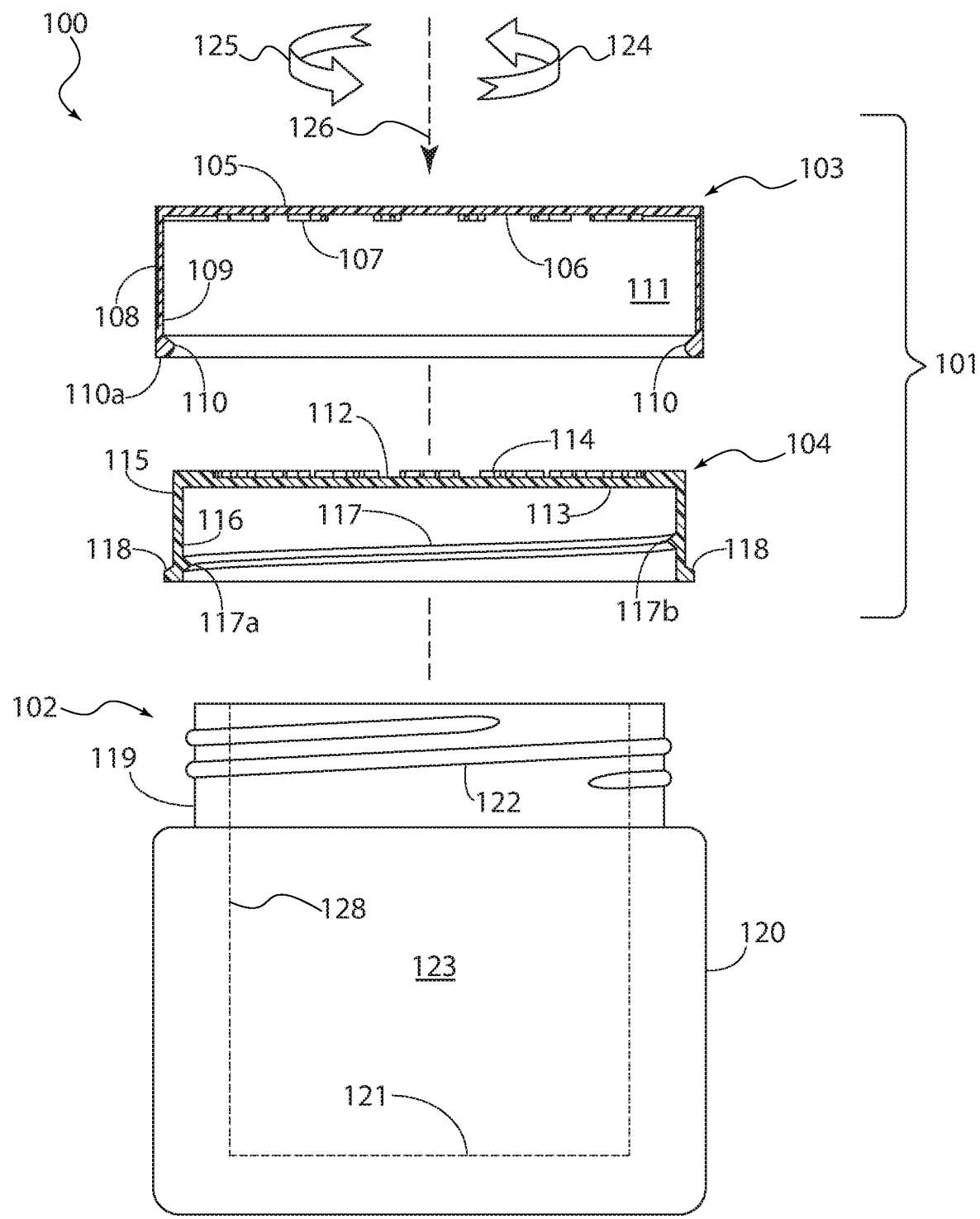
FIG. 1 illustrates a cross-sectional, exploded view of a childproof jar in accordance with an exemplary embodiment of the present invention.

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized, and changes may be made without departing from the scope of the invention. Wherever possible, the same reference numbers are used in the drawings and the following description to refer to the same or similar elements.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and or steps. Thus, such conditional language is not generally intended to imply that features, elements and or steps are in any way required for one or more embodiments, whether these features, elements and or steps are included or are to be performed in any particular embodiment.

The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present. The term "and or" means that "and" applies to some embodiments and "or" applies to some embodiments. Thus, A, B, and or C can be replaced with A, B, and C written in one sentence and A, B, or C written in another sentence. A, B, and or C means that some embodiments can include A and B, some embodiments can include A and C, some embodiments can include B and C, some embodiments can only include A, some embodiments can include only B, some embodiments can include only C, and some embodiments include A, B, and C. The term "and or" is used to avoid unnecessary redundancy.

While exemplary embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the invention or inventions disclosed herein. Accordingly, the following detailed description does not limit the disclosure. Instead, the proper scope of the disclosure is defined by the appended claims.

Turning now to the figures, FIG. 1 illustrates a cross-sectional, exploded view of a childproof jar in accordance with an exemplary embodiment of the present invention. More specifically, FIG. 1 depicts childproof jar 100, which is shown comprising a childproof cap (cap 101) and a jar 102 adapted to receive cap 101. As mentioned above, childproof jar 100 may be utilized for many purposes, and thus childproof jar 100 may be suitable for storing items such as prescription medication, non-prescription medication, supplements, edibles or consumables and other items that may be desirably restricted from children and desirably stored in a container such as a jar, which in exemplary embodiments is typically a glass jar.

Cap 101 may be constructed of various materials without limiting the scope of the present invention, although typically constructed of plastics. Moreover, as is shown in the exploded view of FIG. 1, cap 101 comprises an exterior or outer cap 103 that houses an interior or inner cap 104. The structural components of cap 101, and more specifically of outer cap 103 and inner cap 104, make up the mechanism requiring a heighten dexterity to operate and thereby open childproof jar 100.

Jar 102 may also comprise of plastics or glass materials without limiting the scope of the present invention; in some embodiments jar 102 is constructed of a plastic or bioplastic resin. In exemplary embodiments however, jar 102 is constructed of glass such as soda-lime glass or soda-lime-silica glass that is suitable for consumables as discussed above. Moreover, in addition to being constructed of glass, in exemplary embodiments jar 102 is treated with a uv-coating that limits the light passing through into its cavity 123. In some embodiments, the uv-coating only limits some lights, while in other exemplary embodiments virtually all light is blocked so that no light rays reach cavity 123. Limiting or restricting light helps preserve the contents of jar 102, and is typically helpful in preserving the potency of certain consumables that may be stored therein.

Outer cap 103 is generally an outer shell of cap 101, which includes a top or outer surface 105, an interior surface 106 (including a plurality of protrusions 107), exterior wall 108 and interior wall 109, which may include an interior ridge 110 that in part defines a cavity 111 of outer cap 103. Exterior wall 108 may be smooth or may include ridges or other elements that add a frictional factor to aid in gripping outer cap 103 during operation of the safety cap 101. Interior wall 109 is generally smooth and flat throughout the interior cavity 111 of outer cap 103. As will be explained further below, inner cap 104 is typically loosely secured inside of cavity 111 of outer cap 103 between interior surface 106 and interior ridge 110 when the childproof cap is not operational.

As can be seen in the drawings, and particularly in FIG.1, interior ridge 110 extends inward towards the interior of cavity 111 constantly along a bottom edge 110a of outer cap 103. Inner surface 106 of outer cap 103 includes a plurality of downward projections 107, which may be radially situated along a circumference of interior surface 106, each of the plurality of downward projections comprising a flat base with parallel protrusions separated by a single narrow elongated gap (further described below with reference to at least FIG. 3, FIG. 5(a) and FIG. 5(b)).

Inner cap 104 is generally an inner shell of cap 101, which includes top surface 112, bottom surface 113 (which may be generally smooth and flat), exterior wall 115, and interior wall 116; top surface 112 comprises of a plurality of upward projections 114 radially situated along a circumference of top surface 112 (further described below at least with reference to FIG. 2, FIG. 4(a) and FIG. 4(b)). Interior wall 116 typically includes at least a single thread 117—generally defined as an interior ridge protruding from inner wall 116 towards the interior of inner cap 104 and running along wall 116 gradually from a lower edge 117a to a higher edge 177b—that engages or registers with a threaded rim mouth of jar 102. In exemplary embodiments, thread 117 is a single continuous thread. Such design is particularly compatible with the several types of threads that may be implemented on jar 102, particularly where jar 102 is a glass jar. For example, where jar 102 is made of glass, complex designs implementing notches, tabs, or other engaging and disengaging components may not be practical to implement on a glass rim mouth; such designs may be prohibitively expensive and or simply not work due to the material limitations of glass in general. Thus, because the present invention preferably implements a glass jar 102 (i.e. as will be discussed below, for preservation purposes of the items stored therein) in preferred embodiments, interior wall 116 of inner cap 104 employs a single continuous thread. In exemplary other embodiments however, a thread such as thread 117 may comprise of sections without limiting the scope of the present invention, which do not require jar 102 to implement auxiliary notches, tabs or similar structures.

Inner cap 104, as mentioned above, rests loosely inside of outer cap 103 whenever cap 101 is not being used (i.e. either because cap 101 is off jar 102, or because cap 101 is securely attached to jar 102). That is, inner cap 104 is of a smaller size and more specifically of a smaller diameter and height than cap 103 so that inner cap 104 may fit inside cavity 111 of outer cap 104, leaving sufficient space between the two caps so that outer cap 103 may rotate independently of inner cap 104 whenever a user—for example a child—twists outer cap 103 in either opening direction 124 or closing direction 125, without properly pressing down or exerting a force along an axis of rotation 126 of cap 101.

Jar 102 may be defined by a rim mouth 119, outside wall 120, inner wall 121 and thread 122, which runs typically along a circumference of rim mouth 119 in a spiraling form. Thread 122 may be a single continuous thread, or in alternative embodiments, thread 122 may comprise of multiple threads that make up a continuous path. As mentioned above, jar 102 may exclude notches, tabs or auxiliary structures for engaging with cap 101 and more specifically for engaging with a corresponding thread 117 of interior wall 116 of inner cap 104.

Figure 2:
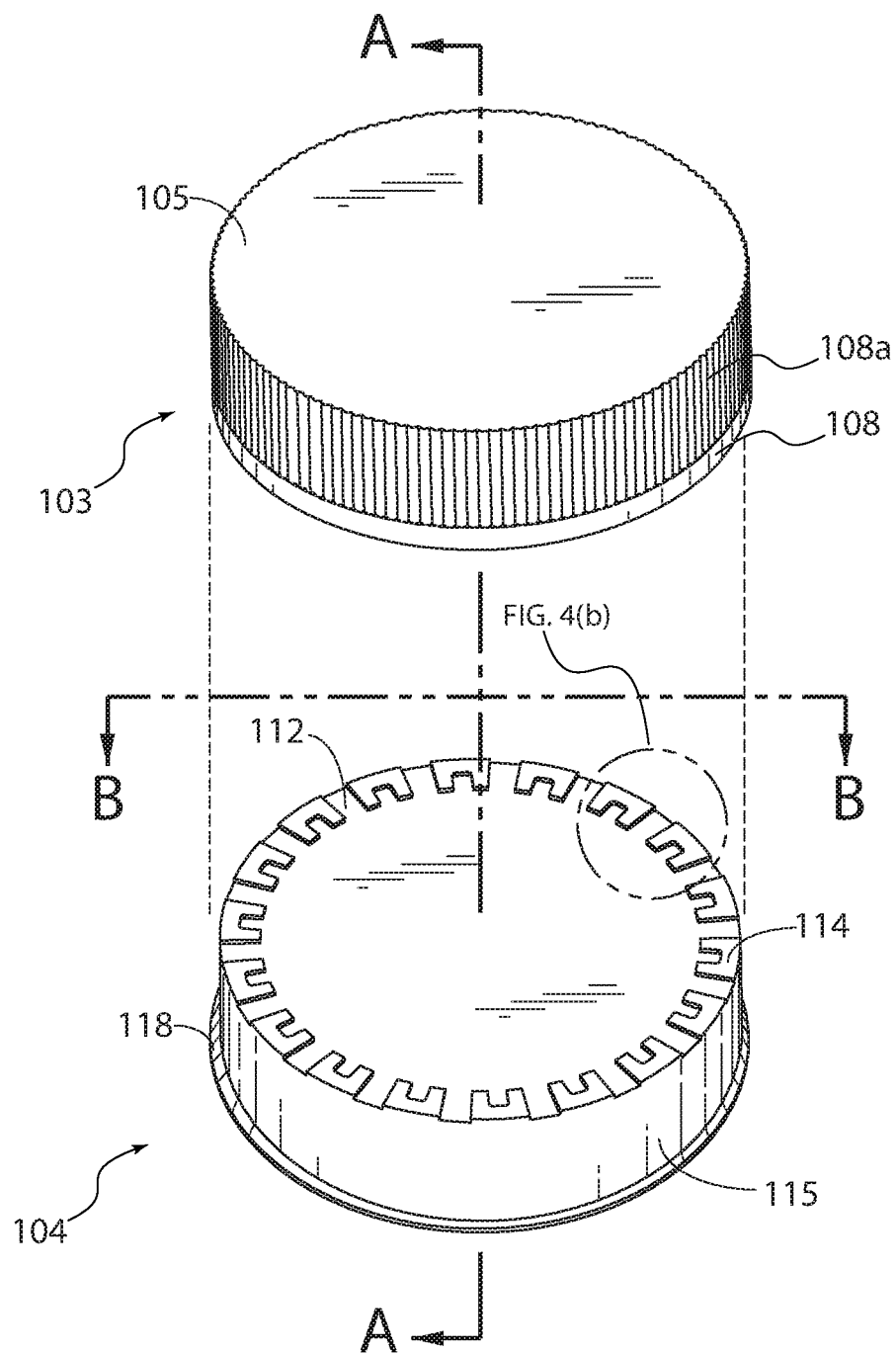
FIG. 2 illustrates an exploded, perspective top view of childproof cap for a childproof jar in accordance with an exemplary embodiment of the present invention.

Turning to the next figure, FIG. 2 illustrates an exploded, perspective top view of childproof cap for a childproof jar in accordance with an exemplary embodiment of the present invention. More specifically, FIG. 2 depicts outer cap 103 above inner cap 104, which is normally inserted inside outer cap 103 within cavity 111 as shown in its fully assembled cross-sectional view of FIG. 6(a) and FIG. 6(b). From this view, it may be appreciated that outer cap 103 has a smooth outer surface 105. Without limiting the scope of the present invention, this smooth surface may be utilized to imprint or label with instructions, trademarks, or other desirable indicia on the smooth outer surface 105. Exterior wall 108 may include a plurality of uniform ridges 108a to add a frictional element or grip to outer cap 103 of cap 101.

FIG. 2 depicts a clearer view of top surface 112 of inner cap 104, which includes upward projections 114 radially situated along an outer edge or outer circumference of the top surface 112 of inner cap 104. In exemplary embodiments, each of the upward projections 114 are evenly spaced apart and shaped in a particular structure. Along a bottom edge of inner cap 104, an exterior ridge 118 projects uniformly outward or away from exterior wall 115, which aids in keeping inner cap 104 inside cavity 111 of outer cap 103. Notably from this view, it may be appreciated that in exemplary embodiments each of the upward projections 114 rise smoothly from exterior wall 115, which facilitates the manufacturing process of inner cap 104. Moreover, in exemplary embodiments, each of the upward projections 114 comprise of c-shaped protrusions, which will be further discussed in more detail with reference to FIG. 4(b), for example.

Figure 3:
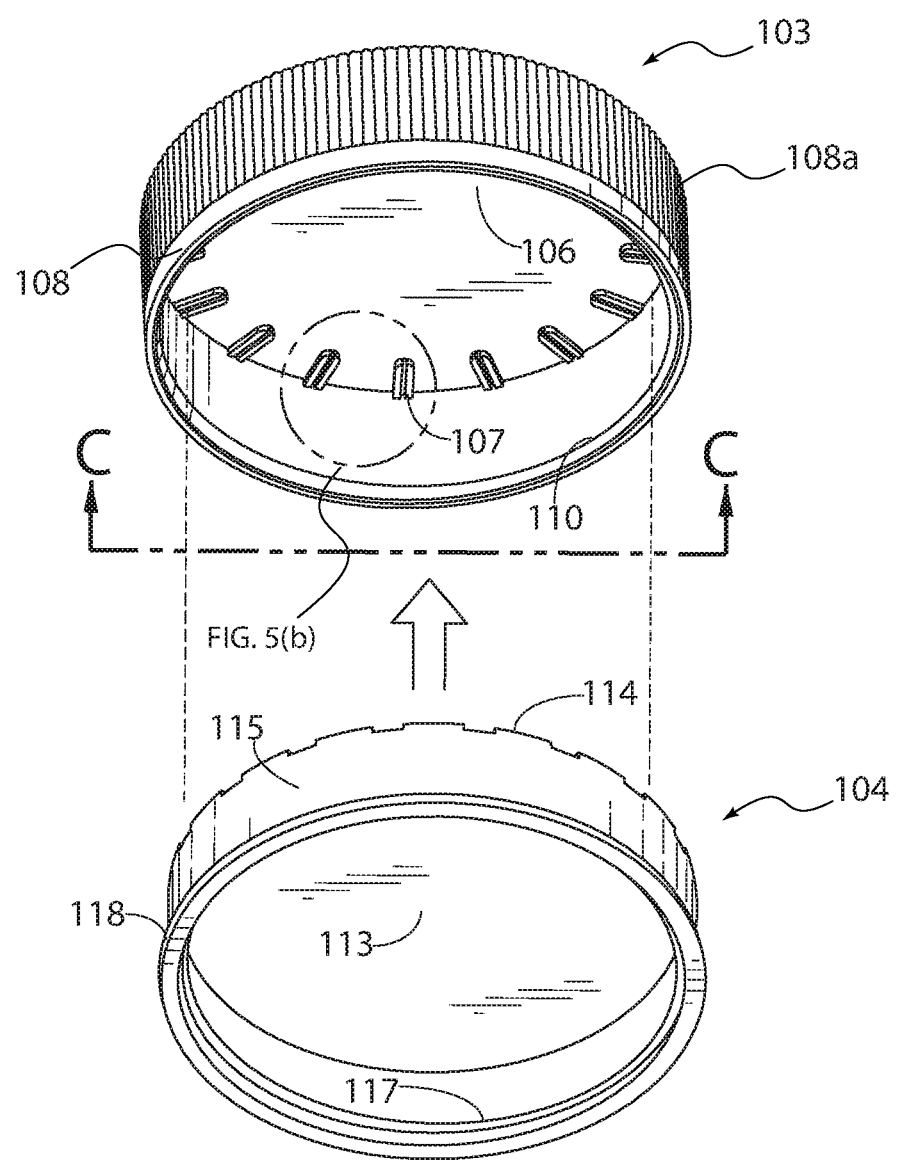
FIG. 3 illustrates an exploded, perspective bottom view of childproof cap for a childproof jar in accordance with an exemplary embodiment of the present invention.

Turning to the next figure, FIG. 3 illustrates an exploded, perspective bottom view of childproof cap for a childproof jar in accordance with an exemplary embodiment of the present invention. From this view, it may be appreciated that interior surface 106 of outer cap 103, although generally smooth, includes a plurality of downward projections 107 radially situated along a circumference of the interior surface 106, which register with upward projections 114 of inner cap 104. In exemplary embodiments, each of the downward projections 107 comprise of a flat base with parallel protrusions separated by a single narrow and elongated gap, which will be further discussed in more detail with reference to FIG. 5(b), for example. Moreover, interior ridge 110 can be seen protruding inward towards an interior or cavity 111 of outer cap 103, interior ridge 110 of outer cap 103 for supporting exterior ridge 118 and keeping inner cap 104 inside cavity 111 of outer cap 103.

From this view, it may be further appreciated that inner cap 104 has a smooth interior or bottom surface 113, and that the inner cap further includes an interior threaded wall that engages the threaded rim mouth of the uv-coated jar during operation of the childproof cap by application of the pressing force on the outer cap. In exemplary embodiments, as the one shown, a single continuous thread 117 runs from a bottom edge of inner cap 104 along interior wall 116 gradually from a lower edge 117a to a higher edge 177b. As mentioned above, thread 117 engages or registers with a complementary thread 122 of threaded rim mouth 119 of jar 102.

Figure 4A:
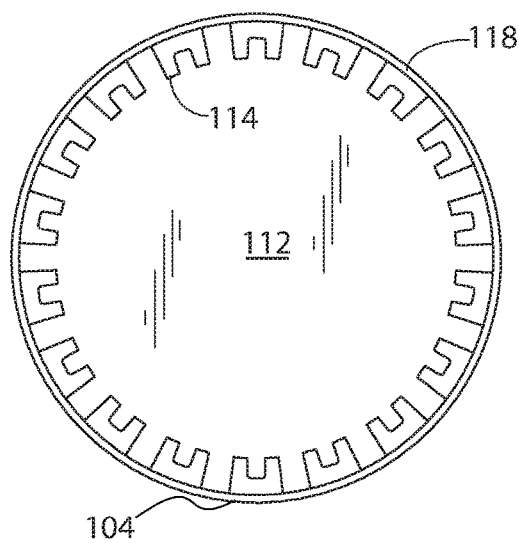
FIG. 4(a) illustrates a top view of an inner cap for a childproof cap in accordance with an exemplary embodiment of the present invention.
Figure 4B:
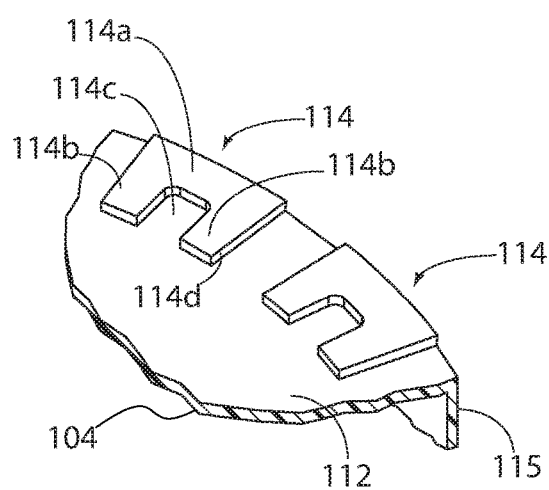
FIG. 4(b) illustrates a surface of an inner cap for a childproof cap in accordance with an exemplary embodiment of the present invention.

Turning now to the next figures, FIG. 4(a) illustrates a top view of an inner cap for a childproof cap in accordance with an exemplary embodiment of the present invention, and FIG. 4(b) illustrates a close-up of a top surface of the inner cap shown therein. More specifically, FIG. 4(a) is a top view of inner cap 104 along line B-B, and FIG. 4(b) is a close-up view depicting two of the plurality of upward projections 114 on top surface 112 of inner cap 104.

From these views, it may be appreciated that in an exemplary embodiment as shown, the plurality of upward projections 114 radially situated along the circumference of top surface 112, comprise of a plurality of c-shaped protrusions. In such embodiment, each of the plurality of c-shaped protrusions (upward projections 114) may be defined by a posterior protrusion or base 114a extending from an outer surface of exterior wall 115 of inner cap 104, and a pair of anterior protrusions or legs 114b extending from the posterior protrusion, which are separated by a gap 114c in-between each of the legs 114b. In the exemplary embodiment shown, the plurality of c-shaped protrusions rise smoothly from exterior wall 115, which facilitates the manufacturing process of inner cap 104. Each of the pair of legs 114b form outer walls 114d of the plurality of upward projections 114 of inner cap 104, which register with the outer walls 107d of the parallel protrusions 107b of the interior surface 106 of outer cap 103 during operation of childproof cap 101. This construction makes for a sturdier cap mechanism that is efficient, more cost effective and easier to manufacture; each of the legs 114b extending from base 114a and separated by gap 114c provide adequate lateral support for engaging with downward projections 107 when cap 101 is in operation, but minimizes the material required to construct inner cap 104.

Figure 5A:
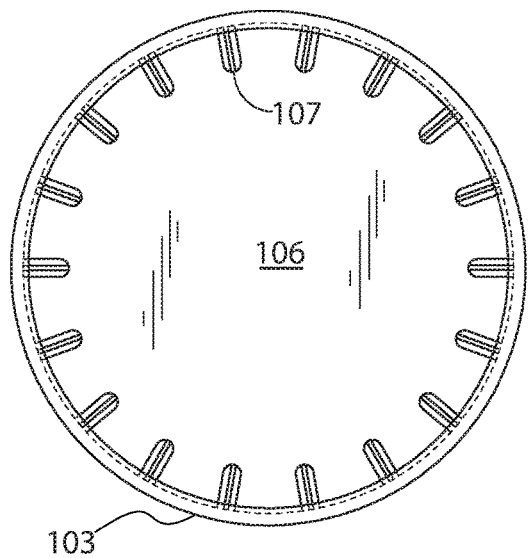
FIG. 5(a) illustrates a bottom view of an exterior cap for a childproof cap in accordance with an exemplary embodiment of the present invention.
Figure 5B:
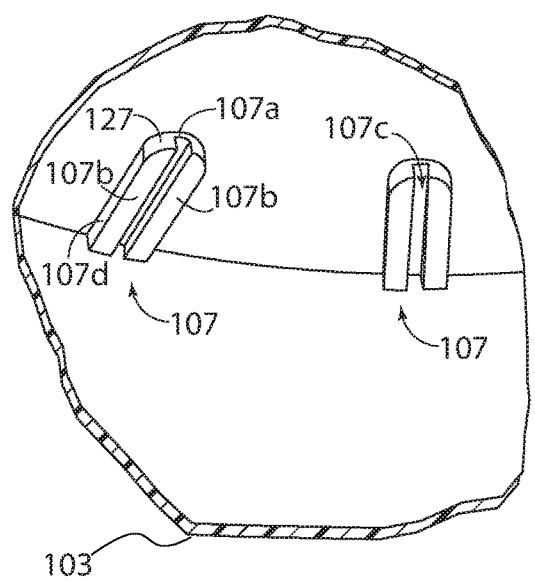
FIG. 5(b) illustrates a bottom surface of an exterior cap for a childproof cap in accordance with an exemplary embodiment of the present invention.

The next set of figures shows the downward projections in greater detail; FIG. 5(a) illustrates a bottom view of outer cap 103 along line C-C, and FIG. 5(b) is a close-up view depicting two of the plurality of downward projections 107 on interior surface 106 of inner cap 103. From these views, it may be appreciated that in an exemplary embodiment as shown, the plurality of downward projections 107 are situated radially along an outer circumference of interior surface 106, extending from interior wall 109 of outer cap 103. Moreover, each of the plurality of downward projections 107 comprises of a flat base 107a, from which a pair of elongated and parallel protrusions 107b extend. Each of the parallel protrusions 107b may be attached or otherwise extend from the interior wall 109. Furthermore, each of the parallel protrusions 107b may terminate with a rounded edge 127, which facilitates longevity of the cap 101 components as inner cap 104 and outer cap 103 constantly make repeated contact against each other. Moreover, the rounded edges facilitate the upward projections and downward projections registering with each other whenever a user presses down on outer cap 103 to operate cap 101.

Accordingly, outer walls 107b of downward projections 107 register in-between upward projections 114 and not within, for example gap 114c so that upon application of a force along the rotational axis of cap 101, a twist of cap 101 will cause outer walls 114d to contact outer walls 107d, which facilitates the otherwise loosely secured inner cap 104 to twist along with outer cap 103 and hence engage both the outer cap 103 and the inner cap 104 so that rotating outer cap 103 engages inner cap 104 with the threading 122 of the jar and the entire cap 101 twists to open or close jar 102. Operation of inner cap 104 and outer cap 103 are further discussed in turn with reference to the following figures.

Figure 6A:
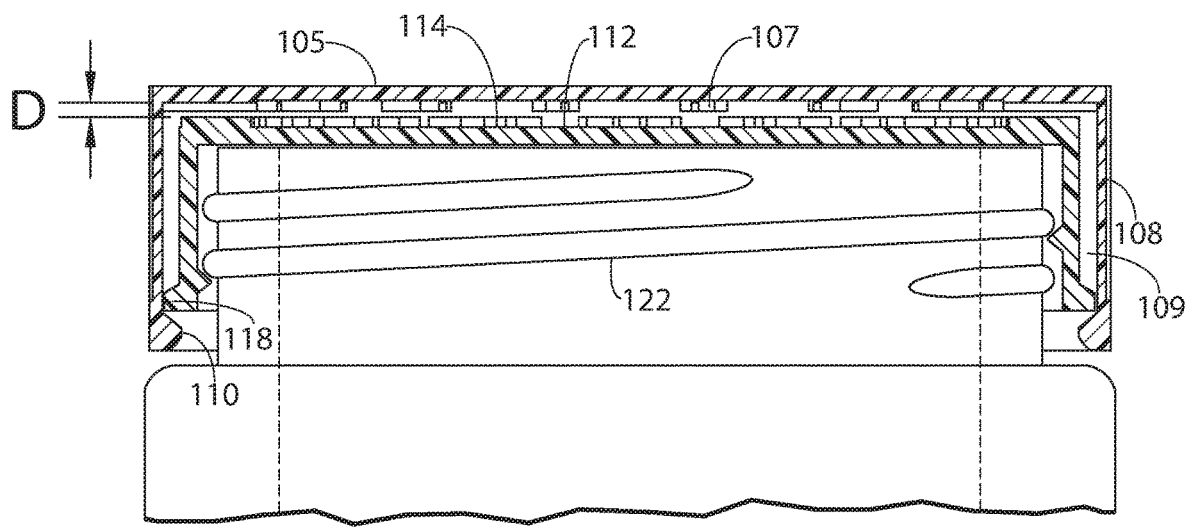
FIG. 6(a) illustrates a cross-sectional view of a childproof jar in accordance with an exemplary embodiment of the present invention.
Figure 6B:
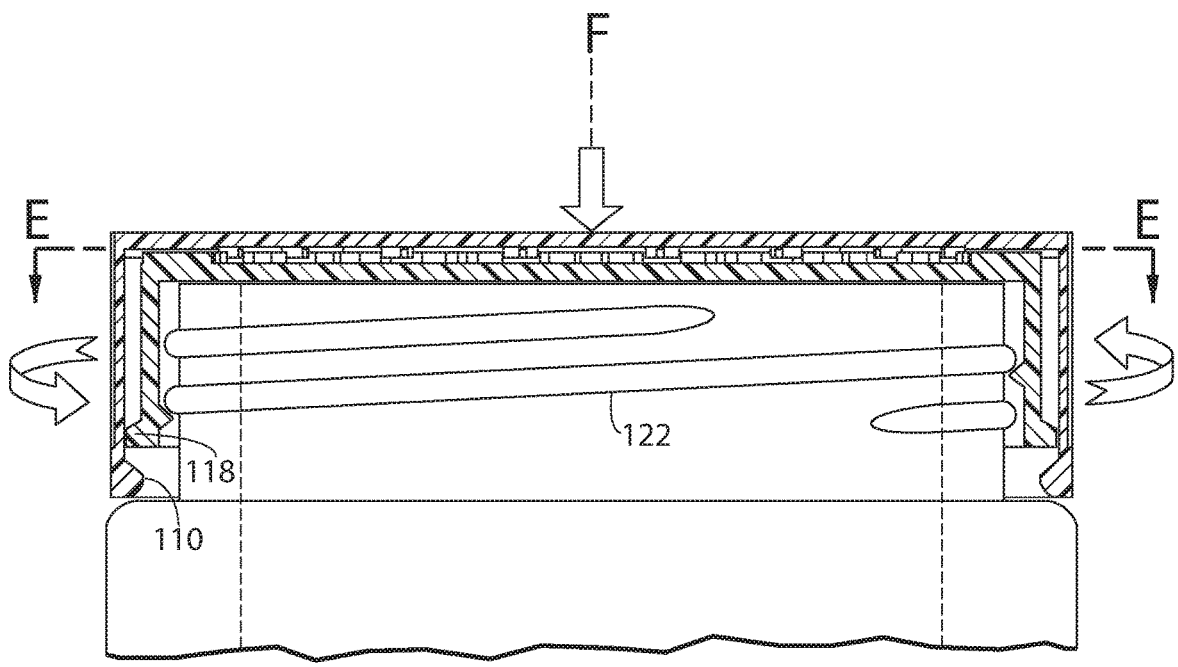
FIG. 6(b) illustrates a cross-sectional view of a childproof jar in accordance with an exemplary embodiment of the present invention, depicting movement of structural elements during its operation.

Turning now to FIG. 6(a) and FIG. 6(b), cross-sectional views of childproof jar 100 are shown, in accordance with an exemplary embodiment of the present invention, the former view illustrating cap 101 in a resting position and the latter illustrating cap 101 during operation of the device.

As depicted in FIG. 6(a), when cap 101 is in a resting position or not being used, inner cap 104 rests loosely secured within cavity 111 of outer cap 103 so that outer cap 103 is free to rotate about rotational axis 126 without causing inner cap 104 to move and thus engage with thread 122 of jar 102. Loosely secured means that there is a spacing D between inner cap 104 and outer cap 103 when cap 101 is in a resting position. Spacing D is large enough to allow outer cap 103 to freely rotate about rotational axis 126 without engagement of downward projections 107 with upwards projections 114 of the complementary caps of cap 101. More specifically, inner cap 104 rests loosely secured within outer cap 103 forming spacing D between interior surface 106 of outer cap 103 and interior ridge 110 of outer cap 103. Inner cap 104's exterior ridge 118 along a bottom edge of inner cap 104 helps secure inner cap 104 inside cavity 111 of outer cap 103 as it rests therein.

As depicted in FIG. 6(b), when cap 101 is in an active position or being used, typically a force F is applied substantially along rotational axis 126 (i.e. by pressing down on outer cap 103) and a user further rotates or twists outer cap 103, which causes downward and upward projections of outer and inner caps to register as described below and shown in the current view. When this occurs, inner cap 104 is engaged with outer cap 103 and thus outer cap 103 no longer turns freely or separately from inner cap 104—meaning that as outer cap 103 turns so does inner cap 104, which in turn engages thread 122 of jar 102.

Figure 6C:
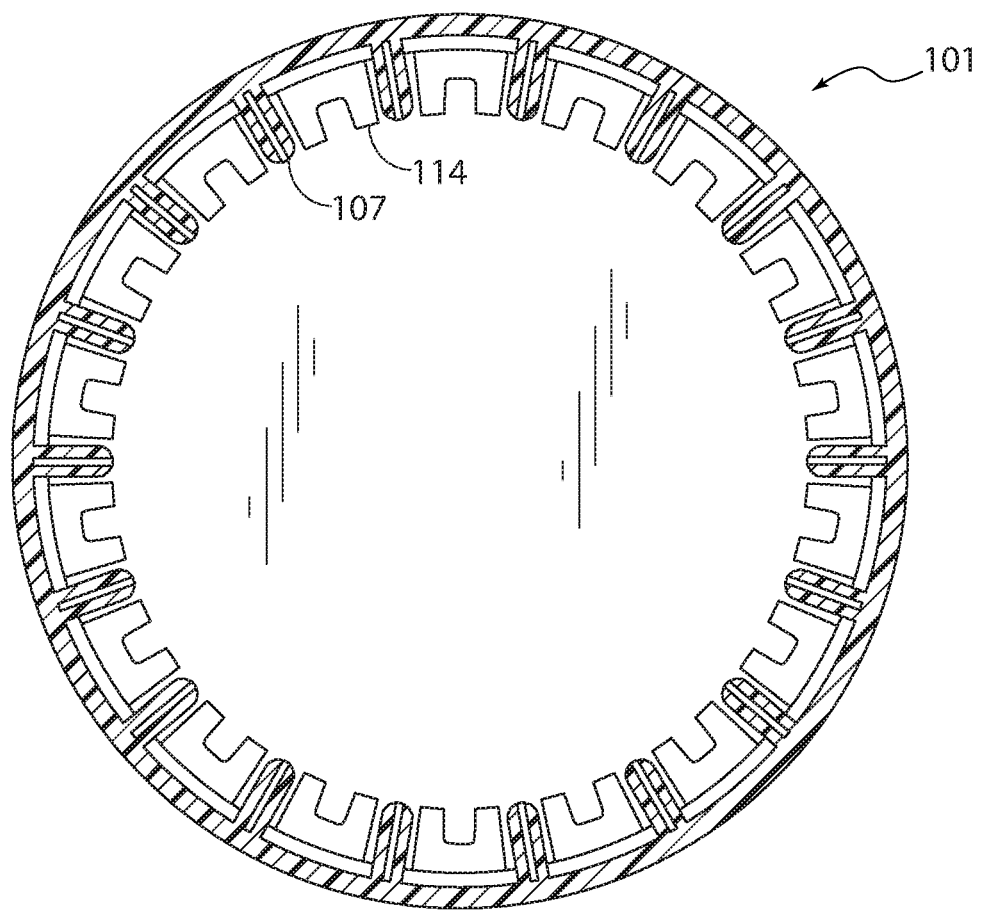
FIG. 6(c) illustrates a cross-sectional view of a childproof cap for a childproof jar, depicting the engagement between an inner cap and an exterior cap in accordance with an exemplary embodiment of the present invention.

Turning to the last figure in this set, FIG. 6(c) illustrates a cross-sectional view along the line segment E-E, depicting the engagement between inner cap 104 and an outer cap 103 in accordance with an exemplary embodiment of the present invention. From this view, the interposition of downward projections 107 in-between the upward projections 114 of outer cap 103 and inner cap 104, respectively is depicted. Accordingly, outer walls 107b of downward projections 107 register in-between upward projections 114 so that a twist of cap 101 will cause outer walls 114d to contact outer walls 107d, which facilitates the otherwise loosely secured inner cap 104 to twist along with outer cap 103 and hence engage the cap with the threading of the jar.

Figure 7A:
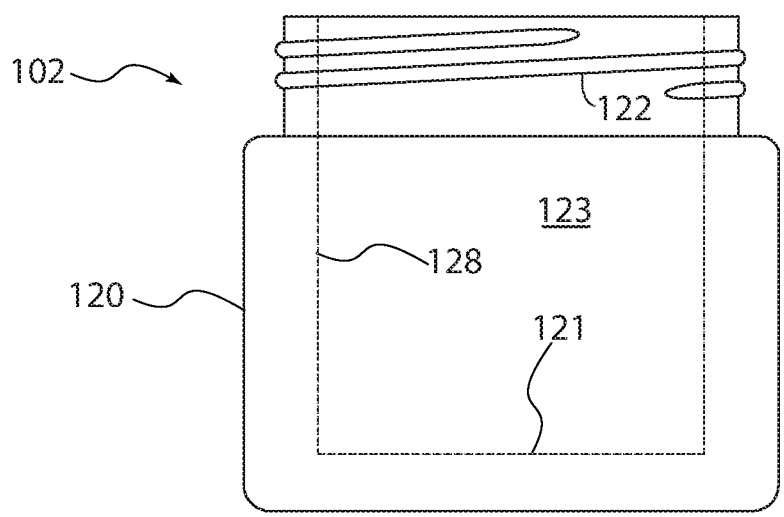
FIG. 7(a) illustrates a childproof jar in accordance with an exemplary embodiment of the present invention.
Figure 7B:
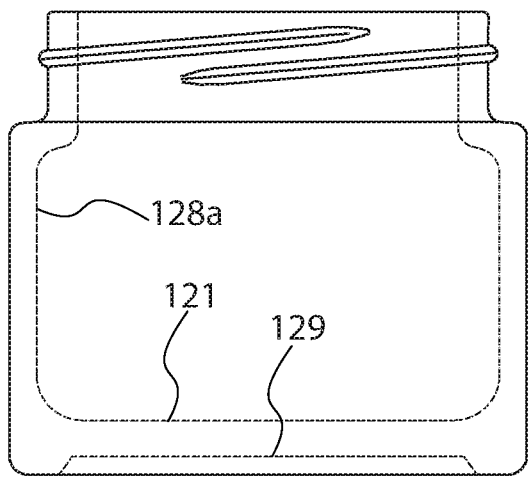
FIG. 7(b) illustrates a childproof jar in accordance with another exemplary embodiment of the present invention.
Figure 7C:
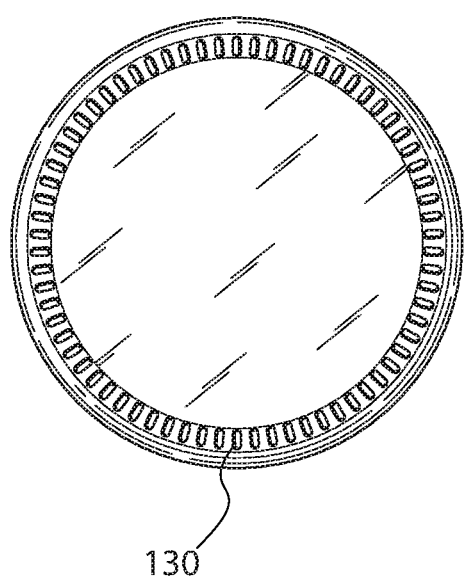
FIG. 7(c) illustrates a bottom view of a childproof jar in accordance with an exemplary embodiment of the present invention.

Turning finally, to the last set figures, FIG. 7(a) illustrates a childproof jar in accordance with an exemplary embodiment of the present invention, and FIG. 7(b) illustrates a childproof jar in accordance with another exemplary embodiment of the present invention. FIG. 7(c) illustrates a bottom view thereof.

In the exemplary embodiment of FIG. 7(a), jar 102 may include inner side wall 128, which does not contour to the shape of exterior wall 120 of jar 102. In an alternative exemplary embodiment however, inner side wall 128a may substantially contour to the shape of exterior wall 120 as shown in FIG. 7(b). In some embodiments, a base 129 may be formed as a bottom of the container, and other known shapes in containers may be implemented without deviating from the scope of the present invention.

Finally, FIG. 7(c) depicts an exemplary bottom surface of jar 102, including a plurality of protrusions 130 that facilitate the jar's manufacture as well as the container's stability, particularly when jar 102 comprises glass.

A childproof jar has been described. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

What is claimed is:

1. A childproof cap for a glass jar having a threaded rim mouth, comprising:
   an outer cap including a smooth interior surface with a plurality of downward projections radially situated along an outer circumference of an interior surface of the outer cap, extending from an interior wall of the outer cap, each of the plurality of downward projections comprising a flat base extended with parallel protrusions separated by an elongated gap; and
   an inner cap including a top surface with a plurality of upward projections radially situated along a circumference of the top surface, wherein:
      the inner cap is adapted to register with the threaded rim mouth of the glass jar, and
      the outer cap is adapted to register with the inner cap upon an application of a pressing force on the outer cap approximately along a rotational axis of the childproof cap, causing outer walls of the plurality of upward projections of the inner cap to register with outer walls of the parallel protrusions of the outer cap in order to operate the childproof cap, wherein the plurality of upward projections radially situated along the circumference of the top surface of the inner cap consist of:
   a plurality of c-shaped protrusions, each of the plurality of c-shaped protrusions defined by a posterior protrusion extending from an outer surface of an exterior wall of the inner cap, where each of the plurality of c-shaped protrusion smoothly rises from the exterior wall, and
   a pair of anterior protrusions extending from the posterior protrusion, which are separated by a gap in-between each of the anterior protrusions, each of the pair of anterior protrusions forming the outer walls of the plurality of upward projections of the inner cap that register with the outer walls of the parallel protrusions of the interior surface of the outer cap in order to operate the childproof cap.

2. The childproof cap of claim 1, wherein the inner cap further includes: an interior threaded wall that engages the threaded rim mouth of the glass jar during operation of the childproof cap by the application of the pressing force on the outer cap.

3. The childproof cap of claim 2, wherein the interior threaded wall of the inner cap comprises a single continuous thread that engages the threaded rim mouth of the glass jar during operation of the childproof cap.

4. The childproof cap of claim 1, wherein the inner cap rests loosely secured within the outer cap between the interior surface and an interior ridge along a bottom edge of the outer cap, when the childproof cap is not operational.

5. The childproof cap of claim 1, wherein the inner cap further comprises: an exterior ridge along a bottom edge of the inner cap, which rests loosely on top of an interior ridge along a bottom edge of the outer cap.

6. The childproof cap of claim 1, wherein the outer cap further comprises an outer wall including a plurality of uniform ridges.

7. The childproof cap of claim 1, wherein the threaded rim mouth of the glass jar comprises a single continuous thread.

* * * * *